United States Patent
Esser

(10) Patent No.: US 7,192,232 B2
(45) Date of Patent: Mar. 20, 2007

(54) SELF-LOCKING FASTENING DEVICE

(75) Inventor: Josef Esser, Neuss (DE)

(73) Assignee: Textron Verbindungstechnik GmbH & Co. OHG (DE)

( * ) Notice: Subject to any disclaimer, the term of this patent is extended or adjusted under 35 U.S.C. 154(b) by 0 days.

(21) Appl. No.: 10/511,132

(22) PCT Filed: Mar. 19, 2003

(86) PCT No.: PCT/DE03/00932

§ 371 (c)(1),
(2), (4) Date: Mar. 15, 2005

(87) PCT Pub. No.: WO03/091583

PCT Pub. Date: Nov. 6, 2003

(65) Prior Publication Data

US 2005/0158140 A1 Jul. 21, 2005

(30) Foreign Application Priority Data

Apr. 23, 2002 (DE) .......................... 202 06 373 U

(51) Int. Cl.
*F16B 39/24* (2006.01)
*F16B 43/02* (2006.01)

(52) U.S. Cl. .................. 411/161; 411/154; 411/176; 411/371.2; 411/158; 411/544; 411/545; 411/156; 411/164

(58) Field of Classification Search ........... 411/176, 411/156, 371.2, 154, 155, 158, 544, 545, 411/161, 162, 163, 164, 160

See application file for complete search history.

(56) References Cited

U.S. PATENT DOCUMENTS

| 302,441 | A | | 7/1884 | Stevens | |
|---|---|---|---|---|---|
| 1,911,384 | A | * | 5/1933 | Olson | 411/155 |
| 2,034,494 | A | * | 3/1936 | Stoll | 411/147 |
| 2,278,062 | A | * | 3/1942 | De Koharovich | 411/144 |
| 2,345,419 | A | * | 3/1944 | Olson | 403/279 |
| 2,778,399 | A | * | 1/1957 | Mroz | 411/161 |
| 3,181,584 | A | * | 5/1965 | Borowsky | 411/134 |

(Continued)

FOREIGN PATENT DOCUMENTS

| DE | 1 129 779 | 5/1962 |
|---|---|---|
| EP | 0 426 895 B1 | 8/1993 |

OTHER PUBLICATIONS

International Search Report dated Jun. 25, 2003 which issued in connection with corresponding PCT Application No. PCT/DE03/00932.

*Primary Examiner*—Katherine Mitchell
(74) *Attorney, Agent, or Firm*—Trexler, Bushnell, Giangiorgi, Blackstone & Marr, Ltd

(57) ABSTRACT

A self-locking fastening device which includes a screw or nut for fastening at least one first part to a second part and a shim (10) which is provided with a central borehole (11). The two surfaces of the shim (10) include rib profiles (12,14) which are fixed within or to the surfaces of the first part and the screw or nut no later than the time that the fastening device is tightened such that self-actuated unscrewing is prevented. The shim (10) is configured in a resilient manner such that the shim (10) can be compressed counter to the resilience thereof during tightening of the fastening device.

6 Claims, 1 Drawing Sheet

U.S. PATENT DOCUMENTS

| | | | |
|---|---|---|---|
| 3,332,464 A * | 7/1967 | Castel | 411/155 |
| 3,390,713 A | 7/1968 | Gutshall | |
| 3,777,796 A * | 12/1973 | Takano | 411/134 |
| 4,034,788 A * | 7/1977 | Melone | 411/134 |
| 4,103,725 A * | 8/1978 | Abe | 411/160 |
| 4,157,725 A * | 6/1979 | Stanaitis | 411/147 |
| 4,302,136 A * | 11/1981 | Abe et al. | 411/158 |
| 5,011,351 A * | 4/1991 | Terry | 411/144 |
| 5,112,178 A * | 5/1992 | Overhues et al. | 411/544 |
| 5,188,441 A * | 2/1993 | Rubel | 305/180 |
| 5,496,142 A * | 3/1996 | Fodor et al. | 411/544 |
| 5,547,326 A * | 8/1996 | Overhues | 411/544 |
| 5,628,599 A * | 5/1997 | Eakin | 411/163 |
| 5,829,933 A * | 11/1998 | Kramer | 411/156 |
| 6,705,813 B2 * | 3/2004 | Schwab | 411/526 |
| 6,887,274 B2 * | 5/2005 | Ralph et al. | 623/17.14 |
| 6,939,097 B2 * | 9/2005 | Carr et al. | 411/368 |

* cited by examiner

SELF-LOCKING FASTENING DEVICE

BACKGROUND OF THE INVENTION

Field of Invention

The present invention generally relates to a self-locking fastening device, and more specifically relates to a self-locking fastening device which includes a screw or nut for fastening at least one first member to a second member, as well as a washer which is provided with a central bore hole which on the surfaces thereof includes means which are fixed within or to the surfaces of the first member and the screw or nut during the tightening of the fastening device such that a self-actuated unscrewing is prevented.

A self-locking fastening device which includes a washer ribbed on both sides is already known from EP 426 895 B1.

The self-locking fastening device disclosed therein, as well as the self-locking screws described in DE 2556985 C2, acts as an effective safety device only as long as a sufficient pretension prevails in the screw connection. If the connection loses its pretension due to extreme setting, then there is no longer any locking against untightening. Since the necessity of securing exists predominantly in connection with short screws having a small clamping length, the danger of untightening is large because the elastic elongation of the screw in connection with a small clamping length is also small. In such cases, settling amounts of very few tenths of millimeters can lead to the loss of pretension, and therefore to the danger of a self-actuated unscrewing of the screw connection.

The problem to be solved by the present invention is therefore to improve a self-locking fastening device according to EP 426895 B1 in such a way that the amount of settling which can be compensated is substantially larger and the possibility of loss of pretension becomes substantially smaller.

SUMMARY OF THE INVENTION

According to the present invention, the problem is solved by the feature that the washer is resilient in such a way that it can be compressed against its spring force during the tightening of the fastening device.

It is preferred that the washer is cambered in the radial direction, wherein the concave side is facing the member and the convex side is facing the screwhead or the nut, respectively. In this manner, the largest possible spring force of the washer is obtained.

Further, it is preferred that the washer is only cambered in the exterior marginal area in a radial direction, while the inner part is flat. The flat inner support ensures that even with a large loss of pretension, the ribs of the upper side of the washer over the entire length of the support of the screw maintain contact with the screw head. This is not absolutely necessary on the bottom side of the washer, because a sufficient locking action is maintained even if the washer springs in the opening direction, due to the very large friction radius of the bottom side of the washer.

Optimal spring characteristics are obtained if the exterior cambered marginal area only extends over the half of the width of the washer between the inner bore hole and the exterior margin.

Preferably, rib profiles are provided as means for preventing a self-actuated unscrewing. These can be simply manufactured and are very efficient.

To conserve cost and materials, it is preferred that the rib profiles on the surface facing the screw or the nut are only provided in the inner area close to the bore hole, and that the rib profiles on the surface facing the member are only provided in the exterior area close to the exterior margin.

It is especially preferred that the rib profiles only cover between half and two thirds of the radial width of the washer.

BRIEF DESCRIPTION OF THE DRAWINGS

The present invention is described in more detail with reference to the two embodiments shown in the drawings, where.

DESCRIPTION

Figure 1:
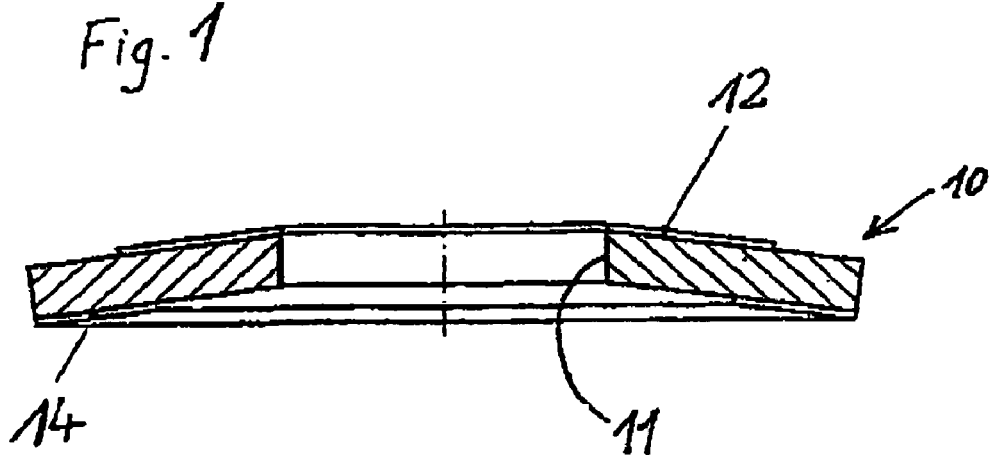
FIG. 1 is a cross-section view of a washer for a self-locking fastening device according to an embodiment of the present invention.

FIG. 1 shows a washer for a self-locking fastening device according to an embodiment of the present invention. The shim 10 has the usual shape of a washer with a central bore hole 11 for passing a thread carrier (bolt, screw). Unlike usual washers, the washer according to the present invention is cambered over the radius from the interior to the exterior and consists of a sufficiently strong resilient material.

In FIG. 1, the shim 10 is shown in such a way that the head of a corresponding screw or a corresponding nut is positioned above the shim and the member to be fastened is positioned below the shim. Accordingly, the shim 10 is cambered convexly in the direction of the head of the screw or the nut and cambered concavely in the direction of the member. The top side of the shim 10, which faces the screw head or the nut, is directly adjacent the central bore hole provided with a suitable rib profile 12 extending over about two thirds of the width of the shim.

Similarly, the bottom side of the shim 10 facing the member is also provided with a suitable rib profile 14 extending from the exterior margin up to about the half of its width. Corresponding rib profiles are known from EP 426895 B1 or DE 2556985 C2, and therefore do not need to be described in more detail.

Figure 2:
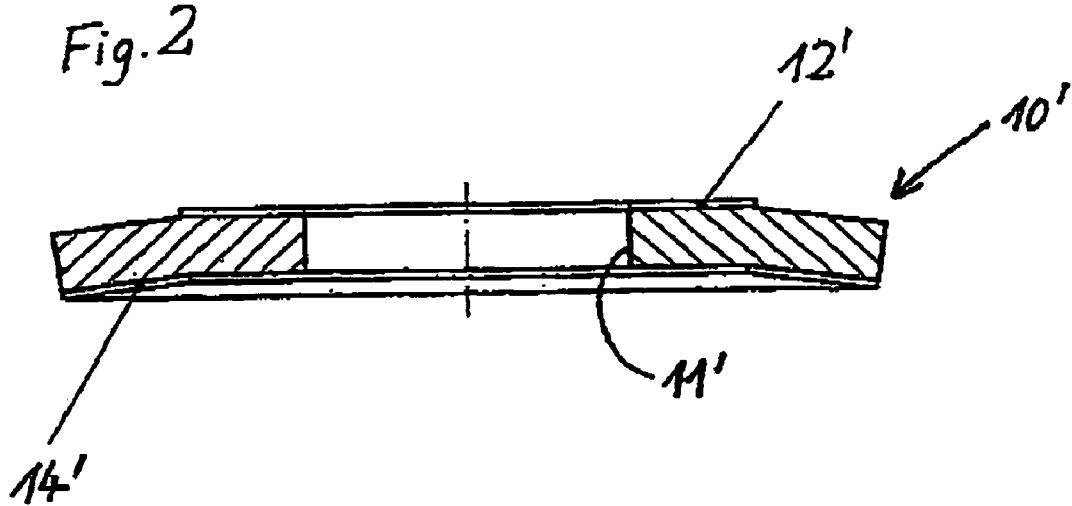
FIG. 2 is also a cross-sectional view of a washer for a self-locking fastening device according to an embodiment of the present invention.

FIG. 2 shows another embodiment of a washer 10' for a self-locking fastening device according to the present invention, wherein the inner region of the shim 10' is flat up to about half of the width of the shim 10', and the camber of the shim begins thereafter. Again, on the top side of the shim 10' facing the screw head or the nut, respectively, there is provided a suitable rib profile 12' only in the flat area, while on the bottom side of the shim 10' facing the member, the rib profile 14' is merely provided in the exterior cambered area.

The function of the self-locking fastening device with these washers 10, 10' according to the present invention is improved such that the washers 10, 10' are pressed into a flat configuration against the spring action of the material of the washers 10, 10' during the tightening of the fastening device. In doing so, the rib profiles 12, 14, 12', 14', as show in EP 426895 B1, for example, are embedded in the material of the screw head or the nut, respectively, and the workpiece. As such, the fastening device is secured against a self-actuated untightening, since a friction being too large would have to be overcome.

In case the connection settles, the washer 10, 10' according to the present invention again (partly) springs in the opening direction and the rib profiles 12, 14, 12', 14' are still pressed with sufficient force against the screw head or the nut, respectively, as well as against the member, in spite of the settling. As such, the security against a self-actuated unscrewing is maintained.

For the present invention, it is of extreme advantage if the spring force of the shim is as large as possible. It is, however, not absolutely necessary to emboss the rib profile on the entire top face and bottom face of the shim. It is sufficient to provide the top side from the bore hole 10 to the exterior diameter about two thirds of the shim support with ribs 12. On the bottom side, it is sufficient to provide the half of the support length on the exterior diameter in the direction of the bore hole 10 with ribs 14 as shown in FIG. 1. Naturally, the shim according to the present invention also functions if the ribs are provided over the entire top side and bottom side of the shim in a way corresponding to the flat disk according to EP 426895 provided on both sides with ribs. The expenditure necessary to this end however can be partly waved.

The embodiment according to FIG. 2 ensures that, even with a larger loss of pretension, the ribs 12' on the top side of the shim remain in contact over the entire length of the support of the screw or nut with the screw head or the nut, due to the flat inner support at the screw head or at the nut. At the bottom side of the shim this is not absolutely necessary, because, due to the very large friction radius, a sufficient safety action is maintained even with the springing of the shim 10' in the opening direction.

Material and heat treatment of the washer according to the present invention can be used and performed in the same way as with the disk according to EP 526895 B1 with ribs on both sides.

The invention claimed is:

1. A self-locking fastening device for engaging a screw or nut for fastening at least a first member to another member, wherein the fastening device comprises a washer having a central bore hole and two surfaces, one of said surfaces being a concave side and the other of said surfaces being a convex side, having rib profiles configured to prevent self-actuated unscrewing, said washer being configured in such a resilient manner that said washer is compressible counter to its resilience thereof by being cambered in an axial direction, wherein the rib profile on the convex side is positioned in an inner area of the washer, proximate the bore hole, and the rib profile on the concave side is positioned in an exterior area of the washer, proximate to an exterior edge of the washer, and that the rib profiles of each of the convex and concave sides each extend over at least half and at most tow thirds of the width of the washer, said width being an area between the bore hole and the exterior edge of the washer.

2. A self-locking fastening device according to claim 1, wherein the washer only in its exterior marginal area is cambered in the radial direction while it is flat in the interior.

3. A self-locking fastening device according to claim 2, wherein the cambered outer marginal area extends only over half the width of the washer, between the inner bore hole and the exterior edge of the washer.

4. A self-locking fastening device according to claim 1, wherein the convex side of the washer has a flat area and a cambered area, and said rib profile on the convex side is only contained in the flat area.

5. A self-locking fastening device according to claim 1, wherein the concave side of the washer has a flat area and a cambered area, and said rib profile on the concave side is only contained in the cambered area.

6. A self-locking fastening device according to claim 1, wherein the convex side of the washer has a flat area and a cambered area, and said rib profile on the convex side is only contained in the flat area, and wherein the concave side of the washer has a flat area and a cambered area, and said rib profile on the concave side is only contained in the cambered area.

* * * * *

UNITED STATES PATENT AND TRADEMARK OFFICE
CERTIFICATE OF CORRECTION

| | | |
|---|---|---|
| PATENT NO. | : 7,192,232 B2 | Page 1 of 1 |
| APPLICATION NO. | : 10/511132 | |
| DATED | : March 20, 2007 | |
| INVENTOR(S) | : Josef Esser | |

It is certified that error appears in the above-identified patent and that said Letters Patent is hereby corrected as shown below:

Column 3, Line 19 "can be partly waved" should be -- can be partly saved --

Column 4, Line 11, "tow thirds" should be -- two thirds --

Signed and Sealed this

Tenth Day of July, 2007

JON W. DUDAS
*Director of the United States Patent and Trademark Office*